(12) United States Patent
Friedrichsen

(10) Patent No.: US 8,479,688 B2
(45) Date of Patent: Jul. 9, 2013

(54) BRAKE MECHANISM FOR A ROPE PULLEY OF A LEASH THAT CAN BE MECHANICALLY WOUND AND UNWOUND FOR LEADING ANIMALS

(75) Inventor: Heiko Friedrichsen, Rickling (DE)

(73) Assignee: Flexi-Bogdahn Technik GmbH & Co. KG, Bargteheide (DE)

( * ) Notice: Subject to any disclaimer, the term of this patent is extended or adjusted under 35 U.S.C. 154(b) by 166 days.

(21) Appl. No.: 12/940,086

(22) Filed: Nov. 5, 2010

(65) Prior Publication Data

US 2011/0146592 A1  Jun. 23, 2011

(30) Foreign Application Priority Data

Dec. 18, 2009 (DE) .................. 20 2009 017 125 U

(51) Int. Cl.
*A01K 27/00* (2006.01)

(52) U.S. Cl.
USPC ............................................... 119/796

(58) Field of Classification Search
USPC ............... 119/796, 794; 242/271, 382, 385, 242/285, 286, 290, 291; 188/64, 65.1, 65.3; 43/20, 21, 26.1
IPC .................................. A01K 27/00; B65H 75/34
See application file for complete search history.

(56) References Cited

U.S. PATENT DOCUMENTS

| | | | |
|---|---|---|---|
| 2,919,676 A | 1/1960 | Schneider | |
| 3,782,215 A | 1/1974 | Moody | |
| D235,026 S | 4/1975 | Bogdahn | |
| 4,156,510 A * | 5/1979 | Hull | 242/240 |
| 4,322,047 A * | 3/1982 | Bonnabaud | 242/128 |
| 5,257,754 A | 11/1993 | Hishon | |
| 5,271,435 A * | 12/1993 | Maina | 139/452 |
| 5,388,776 A * | 2/1995 | Childre | 242/239 |
| 5,401,034 A | 3/1995 | Mallinger | |
| 5,483,926 A | 1/1996 | Bogdahn | |
| D392,429 S | 3/1998 | Plewa et al. | |
| 5,778,943 A * | 7/1998 | Tholander | 139/452 |
| 5,984,221 A * | 11/1999 | Kim | 242/289 |
| 6,095,199 A * | 8/2000 | Jacobsson | 139/452 |
| 6,148,773 A | 11/2000 | Bogdahn | |
| D439,302 S | 3/2001 | Plewa | |
| 6,336,605 B1 * | 1/2002 | Littau et al. | 242/289 |
| D519,246 S | 4/2006 | Plewa | |
| 7,040,257 B2 | 5/2006 | Waxman et al. | |
| 7,168,393 B2 | 1/2007 | Bogdahn et al. | |
| D573,314 S | 7/2008 | Plewa | |
| D610,752 S | 2/2010 | Roediger | |
| 2007/0131177 A1 | 6/2007 | Perkitny et al. | |

(Continued)

*Primary Examiner* — Son T Nguyen
*Assistant Examiner* — Shadi Baniani
(74) *Attorney, Agent, or Firm* — Howson & Howson LLP

(57) ABSTRACT

A brake mechanism for a rope pulley of a leash. A rope is unwound from a pulley against the force of a spring and wound onto the pulley due to the force. The brake mechanism includes a brake button movable from an idle position, in which the pulley is freely rotatable, into a functional position, in which the brake button blocks unwinding of the rope. The brake button has an actuatable upper part protruding from the leash housing and a lower part cooperating with the pulley. The lower part is pivotable in the winding direction such that unwinding of the rope from the pulley is prevented, but can be wound onto the pulley in the functional position. The lower part engages brush bristles in the functional position to pivot the lower part due to pulley rotational movement in the winding direction.

7 Claims, 8 Drawing Sheets

U.S. PATENT DOCUMENTS

| | | |
|---|---|---|
| 2008/0011895 A1 | 1/2008 | Bleshoy |
| 2008/0230015 A1 | 9/2008 | Bleshoy |
| 2008/0276882 A1 | 11/2008 | Bogdahn |
| 2009/0114759 A1 | 5/2009 | Bogdahn |

* cited by examiner

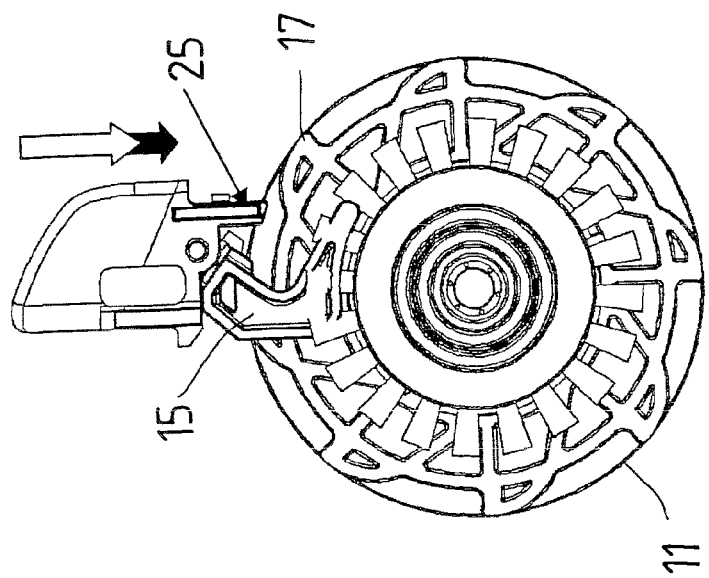
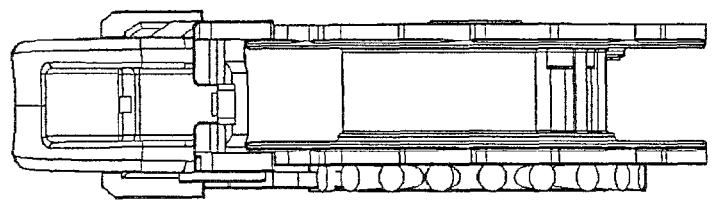
FIG.4
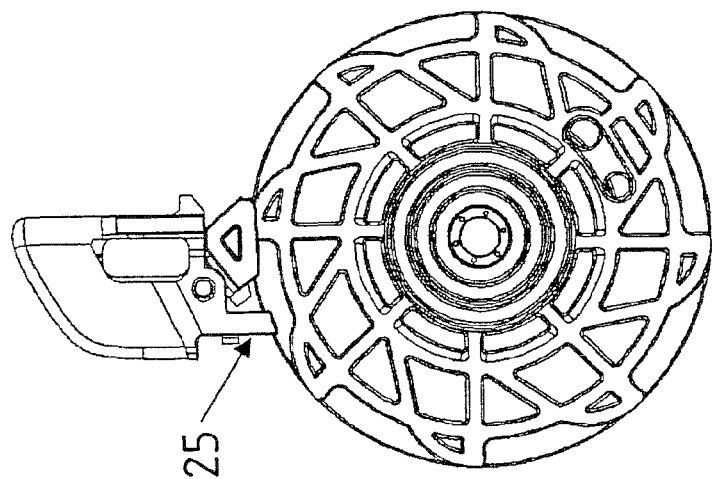

BRAKE MECHANISM FOR A ROPE PULLEY OF A LEASH THAT CAN BE MECHANICALLY WOUND AND UNWOUND FOR LEADING ANIMALS

BACKGROUND

The invention pertains to a brake mechanism for a rope pulley of a leash that can be mechanically wound and unwound for leading animals, wherein a belt or the rope can be unwound from the rope pulley against the force of a spring and wound onto the rope pulley due to the force of the spring, wherein the brake mechanism comprises a brake button that can be moved from an idle position, in which the rope pulley is freely rotatable, into a functional position, in which the brake button blocks the unwinding of the rope from the rope pulley, wherein the brake button features an upper part that protrudes from the leash housing and enables the user to actuate the brake mechanism, as well as a lower part that cooperates with the rope pulley and is connected to the upper part so that it can pivot, and wherein the lower part can be pivoted in the winding direction of the rope such that, in the functional position of the brake button, the rope is prevented from being unwound from the rope pulley, but can be wound onto the rope pulley. The invention specifically pertains to an automatic dog leash such that the following description primarily refers to such a dog leash, but this does not imply that the invention is limited to such an embodiment. Although the following description also primarily refers to a rope, the leash may also be realized in the faun of a belt.

A brake mechanism of this type is known from DE 20 2007 004 273 U1 of the applicant. Along its circumference, the rope pulley features a plurality of projections that come in contact with the lower part of the brake button in the depressed state. This prevents further unwinding of the rope from the rope pulley. In this depressed state, the lower part frictionally cooperates with the rope pulley such that the lower part pivots during a rotation of the rope pulley in the winding direction and allows a rotation of the rope pulley in the winding direction. When the rope pulley rotates in the unwinding direction again, the lower part pivots back into the blocking position and prevents further unwinding of the rope. This measure simplifies the retrieval of the dog because the rope pulley can be moved in the direction of the dog while the brake button is depressed such that the rope is wound onto the pulley. When the dog leash is subsequently pulled back, the rope pulley slightly rotates in the unwinding direction such that the lower part of the brake button pivots into its functional position and prevents further unwinding of the rope from the pulley. Such a friction element makes it possible to prevent annoying noises like those of a ratchet mechanism.

It was determined that the assembly of such a dog leash is associated with certain problems. It is necessary, in particular, to exactly observe the distance, by which the brake button is displaced relative to the friction surface on the rope pulley, in order to achieve sufficient friction between the lower part and the circumferential surface. The friction element between the lower part and the rope pulley is also subjected to considerable wear. It was furthermore determined that constant use and progressive wear may cause the lower part to no longer pivot back sufficiently such that the leash remains fully functional, but the retrieval process is associated with undesirable noises.

SUMMARY

The invention is based on the objective of designing a brake mechanism for a rope pulley of the initially described type such that it functions in the same way, but noises that occur when the leash is wound are reliably prevented.

This objective is attained, according to the invention, in that the lower part cooperates with the rope pulley by means of bristles of a brush in the functional position in order to pivot the lower part due to a rotational movement of the rope pulley in the winding direction, namely in such a way that the rope pulley is rotatable in the winding direction. The arrangement of bristles between the lower part and the rope pulley provides the advantage that an exact manufacture of the parts that move relative to one another is no longer required. The bristles can be sufficiently long and cause the lower part to pivot in any case, namely even if the dimensions were not exactly observed during the manufacture. The utilization of bristles furthermore allows a certain wear of the friction surface and of the bristles without influencing the function such that a reliable long-term operation of the winding leash is ensured.

The lower part is connected to the upper part along a pivoting axis that extends parallel to the rotational axis of the rope pulley. The lower part is functionally engaged with the bristles by depressing the upper part in the direction of the rope pulley. Due to the rotation of the rope pulley in the winding direction, i.e., during a movement of the winding leash toward the animal, the lower part is pivoted about this pivoting axis in such a way that the lower part does not come in contact with the projections on the rope pulley. Noises therefore are reliably prevented. During the rotation of the rope pulley in the opposite direction, i.e., in the unwinding direction, the bristles pivot the lower part into a position, in which it engages with the projections on the rope pulley. Further unwinding is reliably prevented.

The bristles of the brush may be fixed on the lower part and lie against a circumferential surface of the rope pulley in the functional position. The circumferential surface may feature projections that protrude radially outward and may be rough or smooth. This ensures that the lower part is reliably pivoted in one or the other direction.

The bristles may be alternatively fixed on a circumferential surface of the rope pulley and extend radially thereto. In this case, it may be practical if the surface of the lower part that cooperates with the bristles features projections that point in the direction of the circumferential surface and is rough or smooth. The lower part is also reliably pivoted into the desired position in this embodiment.

It would also be conceivable that the circumferential surface has a smaller diameter than the rope pulley and extends axially adjacent thereto. Consequently, the circumferential surface is arranged on a circular projection that extends in the axial direction in the form of an axial extension of the rope pulley and rotates together with the rope pulley. This has the advantage that the diameter of the rope pulley is not increased by the bristles. The lower part features a pivoted lever that extends adjacent to the lateral flanks of the rope pulley, between which the rope is wound. The housing of the winding leash therefore does not have to have a larger diameter than a conventional winding leash. It is merely required to slightly increase the width such that sufficient space is available for the bristles and the element of the lower part cooperating therewith. However, this is not objectionable.

If the bristles are arranged on an adjacently arranged circumferential surface of the rope pulley, they may be realized such that they do not protrude past the outer circumferential surface of the rope pulley. This means that the radial outside dimensions of the leash housing do not have to be changed.

The bristles of the brush may consist of any material. The bristles may consist of a plastic material. The utilization of plastic has the advantage that the bristles are relatively insensitive to penetrating moisture and dirt. Consequently, the reliable operation of the brake mechanism is preserved.

The bristles may be arranged on the circumferential surface or the lower part in a uniformly distributed fashion. However, it would also be possible to arrange the bristles on the circumferential surface or the lower part in bundles. Both measures ensure the reliable pivoting of the lower part into one or the other direction. The bristles arranged on the lower part essentially extend in the direction of the rotational axis of the rope pulley. This ensures that the bristles can cooperate well with the circumferential surface on the rope pulley.

It is also possible to provide the circumferential surface and the lower part with cooperating bristles that face one another. The reliable pivoting of the lower part on the upper part is also ensured in this case.

According to an additional development of the invention, it is proposed that the upper part can be moved into the functional position with the lower part up to a limit stop. This ensures that the lower part is held at such a distance from the rope pulley that the lower part can be pivoted between the two positions.

In this case, it would be possible to realize the limit stop in the form of a pressure point that can be overcome by exerting a predetermined force such that the lower part or a blocking element connected thereto or to the upper part blocks the rope pulley in the unwinding direction, as well as in the winding direction. Such a pressure point is known from initially cited DE 20 2007 004 273 U1 and therefore does not have to be described in greater detail. In this position, the rope pulley is blocked in both rotating directions. The leash therefore has the adjusted length.

It would furthermore be possible that the brake button is held in the functional position by a locking lever. In its functional state, the locking lever also blocks the rope pulley in the winding direction. Due to this measure, the rope is reliably held at the respectively adjusted length without the user having to continuously depress the brake button.

BRIEF DESCRIPTION OF THE DRAWINGS

The invention and the function of the brake mechanism are described in greater detail below with reference to the schematic drawings. In these drawings:

FIGS. 4a-c show the rope pulley when the brake button is completely depressed.

DETAILED DESCRIPTION

Figure 1:
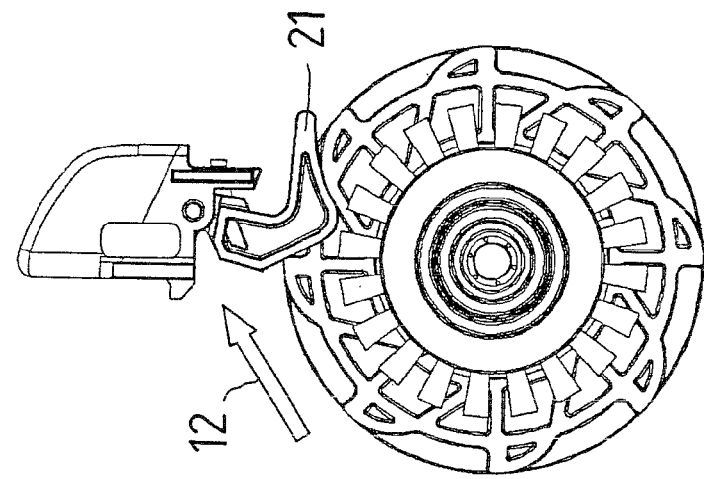
FIGS. 1a-c show the rope pulley and the brake button in the idle position, namely from both sides (a, c) and from the front (b)
Figure 1:
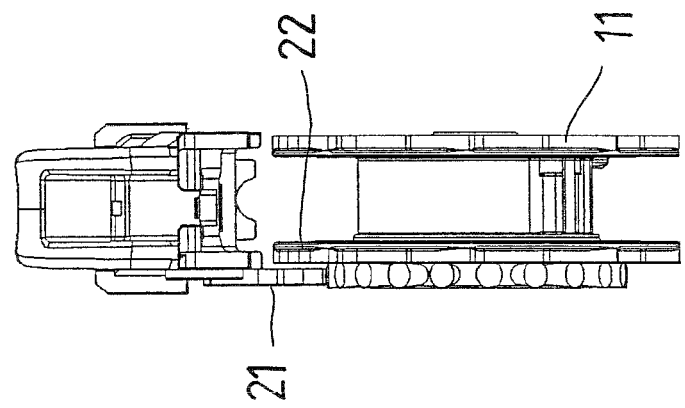
Figure 1:
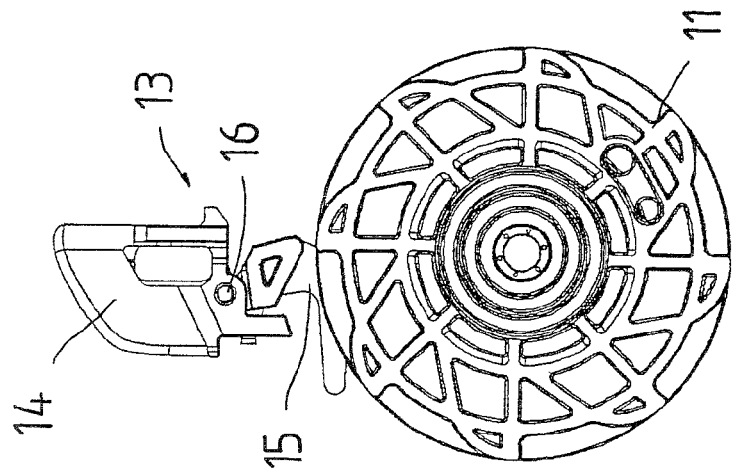

The leash for leading animals illustrated in the drawings features a rope pulley 11 that is rotatable in an unwinding direction 12 against the force of a spring such that the not-shown rope is unwound from the pulley 11. A brake button 13 is arranged in a housing that is not illustrated in the drawings such that it can be displaced back and forth. This brake button 13 makes it possible to block the rope pulley in the unwinding direction, as well as in the winding direction.

The brake button 13 features an upper part 14 that protrudes from the leash housing in the assembled state of the leash and enables the user to actuate the brake mechanism. In addition, a lower part 15 is provided and connected to the upper part 14 of the brake button 13 in a pivoted fashion along a pivoting axis 16. The arrangement is specifically realized in such a way that the lower part cooperates with projections 17 on the lateral flanks 22 of the rope pulley 11 in order to prevent a rotation in the unwinding direction in the position shown in FIG. 2. In the idle position illustrated in FIG. 1, the locking tab 18 of the lower part cannot engage with the projections 17 such that the rope pulley is rotatable in both rotating directions.

The rope pulley 11 furthermore features a brush 19, the bristles 20 of which cooperate with an extension 21 of the lower part 15. In this case, the extension 21 extends laterally adjacent to the lateral flank 22 of the rope pulley 11. The brush 19 is arranged on an axial projection of the rope pulley that is connected to the rope pulley in a rotationally rigid fashion and on the circumferential surface 23 of which the bristles 20 are fixed. In this case, the bristles 20 extend in the radial direction of the rope pulley. The extension and the rope pulley may be integrally connected to one another.

Figure 2:
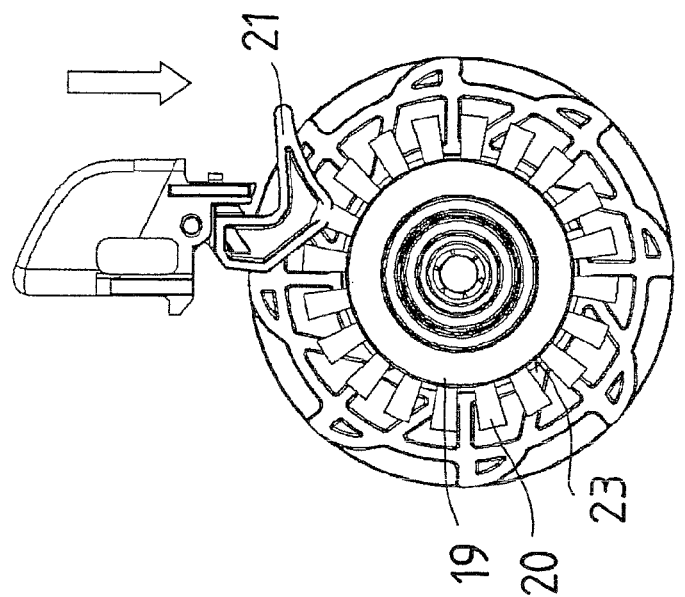
FIGS. 2a-c show the rope pulley while the brake button is depressed and the lower part is in the functional position.
Figure 2:
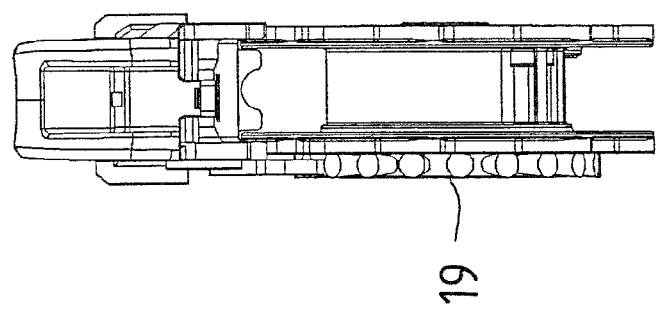
Figure 2:
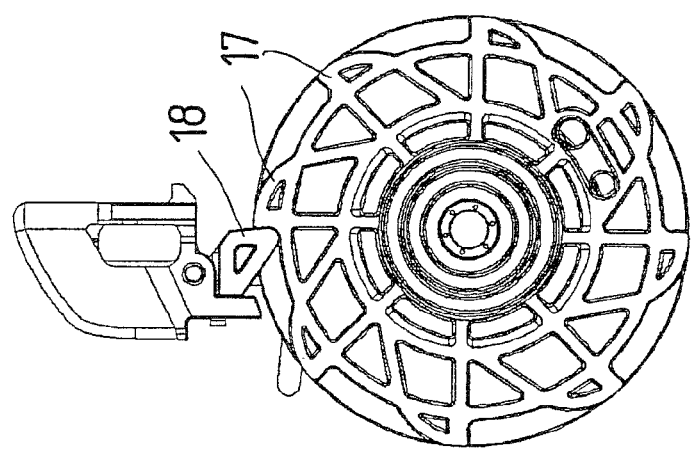

In the idle position illustrated in FIG. 1, the lower part 15 and its locking tab 18, as well as the extension 21, are disengaged from the rope pulley 11 or the brush 19. In the functional position illustrated in FIG. 2, in which the brake button is depressed, the pulley can no longer rotate in the unwinding direction 12 because the locking tab 18 is in contact with the projection 17.

Figure 3:
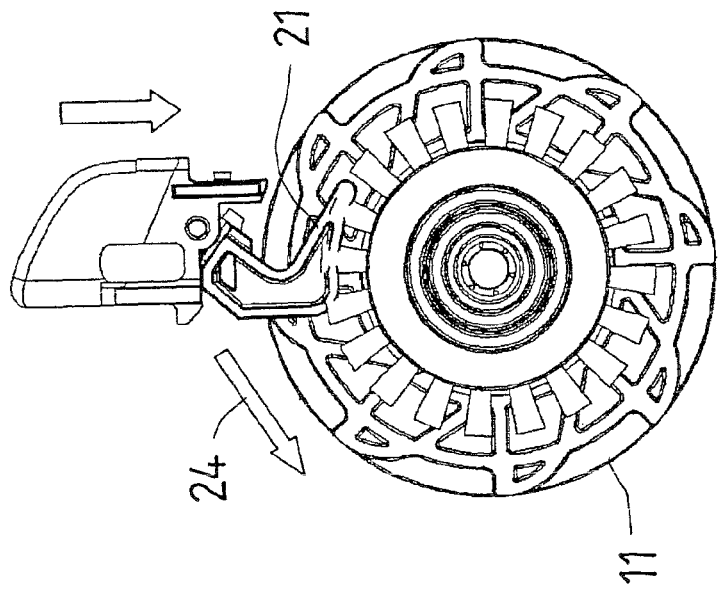
FIGS. 3a-c show the illustrations according to FIG. 2, however, with pivoted lower part.
Figure 3:
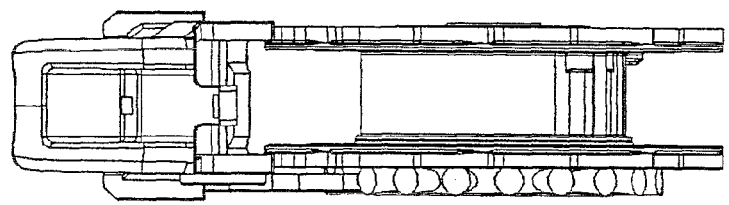
Figure 3:
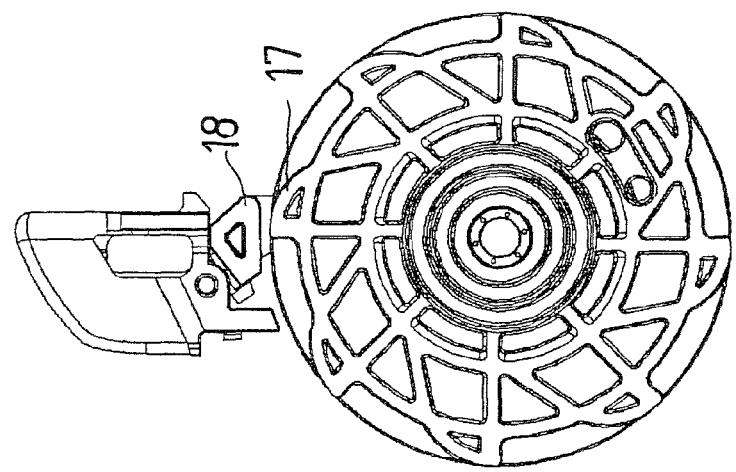

In the functional position of the brake button illustrated in FIG. 3, the rope pulley rotates in the winding direction 24. The extension 21 penetrates into the bristles 20 of the brush 19 and thusly causes the lower part 15 to be pivoted into a position, in which the locking tab 18 cannot be engaged with the projections 17 of the rope pulley 11. The rope pulley therefore is freely rotatable in the winding direction 24. In this position, the rope can be wound onto the rope pulley due to the spring force without noises.

FIG. 4 shows the position of the brake button, in which the rope pulley is blocked in the winding direction, as well as in the unwinding direction. A pressure point is provided and the brake button needs to be depressed beyond this pressure point in the direction of the rope pulley from the functional position illustrated in FIGS. 2 and 3. This causes the extension 21 of the lower part 15 to penetrate further into the bristles, wherein this is possible due to the elasticity of the bristles. A blocking element 25 that is connected to the lower part 15 simultaneously engages with the projections 17 of the rope pulley 11. This blocking element 25 is rigidly connected to the upper part such that the rope pulley is reliably prevented from rotating in the winding direction 24, as well as in the unwinding direction 12.

It would also be possible to provide not-shown locking means in order to hold the brake button in the functional position. Such locking levers are known, for example, from DE 298 04 615 U1 of the applicant and therefore require no detailed description. The locking means also engage into the projections 17 of the rope pulley 11 in the locking position in order to prevent further unwinding of the rope. In this case, the leash for leading the animal can be used with a predetermined and fixable leash length.

The area of the extension 21 of the lower part that faces the bristles has a surface that extends in the circumferential direction over two or more bristle bundles 20 of the brush. This ensures that the lower part is reliably pivoted back and forth as a function of the rotating direction of the rope pulley. Pendulum movements of the lower part, in particular, are prevented because several bristles or bristle bundles always engage on and reliably hold the lower part in the pivoted position.

A second embodiment of a leash for leading animals is illustrated in FIGS. 5a-c to FIGS. 8a-c and is similar in most respects to the rope pulley 11 and brake button 13 discussed above and illustrated in FIGS. 1a-c to 4a-c. For example, the rope pulley 31 includes lateral flanks 42 and projections 37 and is rotatable in an unwinding direction 32 against the force of a spring (not-shown) and in a winding direction 44 such that a rope (not-shown) can be unwound from the pulley 31 and wound onto the pulley 31. The brake button 33 is arranged in a housing (not shown) such that it can be displaced back and forth. The brake button 33 can be used to make it possible to block rotation of the rope pulley 31 in the unwinding direction 32, as well as in the winding direction 44.

Similar to the brake button 13 discussed above, the brake button 33 of the second embodiment has an upper part 34 that protrudes from the leash housing in the assembled state of the leash and enables the user to actuate the brake mechanism. In addition, the brake button 33 has a lower part 35 that is connected to the upper part 34 of the brake button 33 in a pivoted fashion along a pivoting axis 36. The arrangement is specifically realized in such a way that the lower part 35 cooperates with the projections 37 on the lateral flanks 42 of the rope pulley 31 to prevent rotation of the pulley 31 in the unwinding direction 32 in the condition shown in FIGS. 6a-c. In contrast, when in the brake button 33 is in an idle position as illustrated in FIGS. 5a-5c, the lower part 35 cannot engage with the projections 37 such that the rope pulley 31 is rotatable in both rotating directions.

Figure 7C:
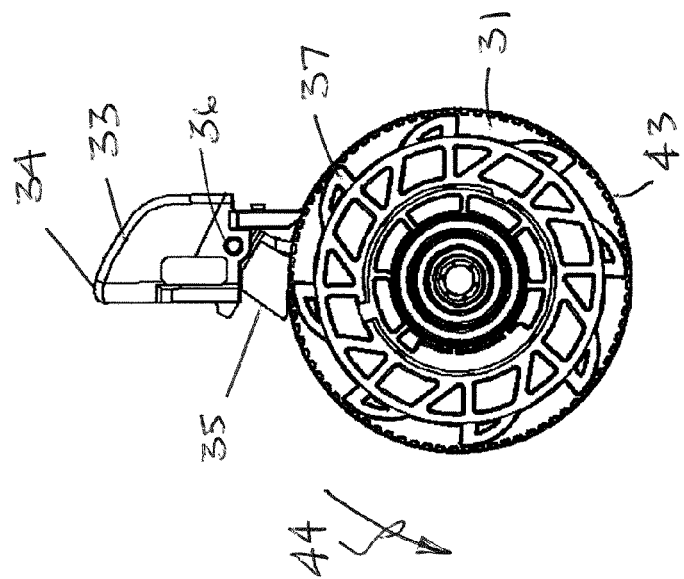
FIGS. 7a-c illustrate the rope pulley of the second embodiment with the brake button depressed and the lower part thereof in the functional position and pivoted (opposite side elevational views being provided in FIGS. 7a and 7c and a front elevational view being provided in FIG. 7b)
Figure 7B:
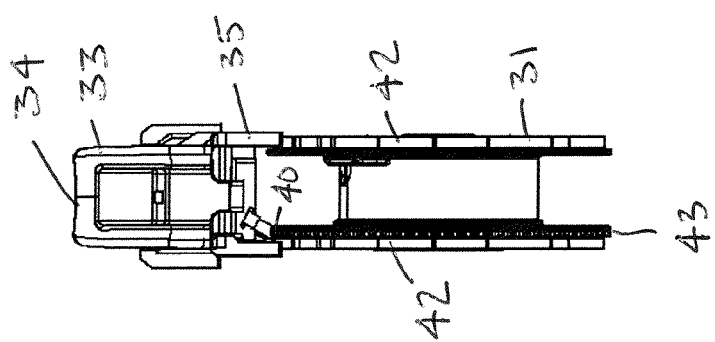
Figure 7A:
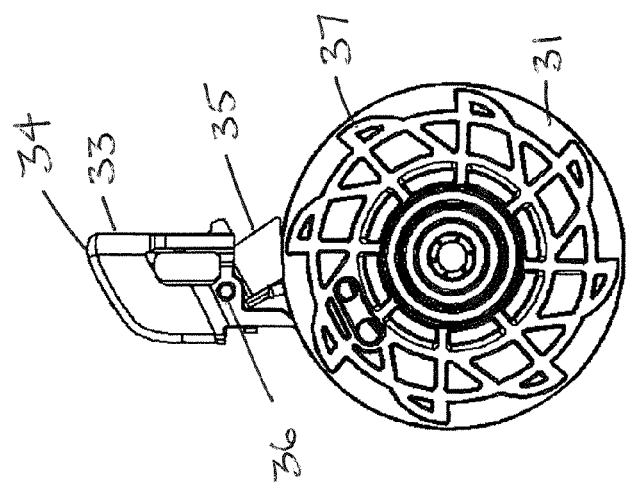

The only difference between the second embodiment and the previously disclosed embodiment of the present invention is that a brush 39 having bristles 40 is connected to and extends from the lower part 35 of the brake button 33 and extends toward the rope pulley 31. Thus, the bristles 40 of the brush 39 are fixed on the lower part 35 and can lie against a circumferential surface 43 of the rope pulley 31 when the brake button 33 is in the functional position. See FIGS. 7a-7c. The circumferential surface 43 can have projections 46 that protrude radially outward.

Figure 5C:
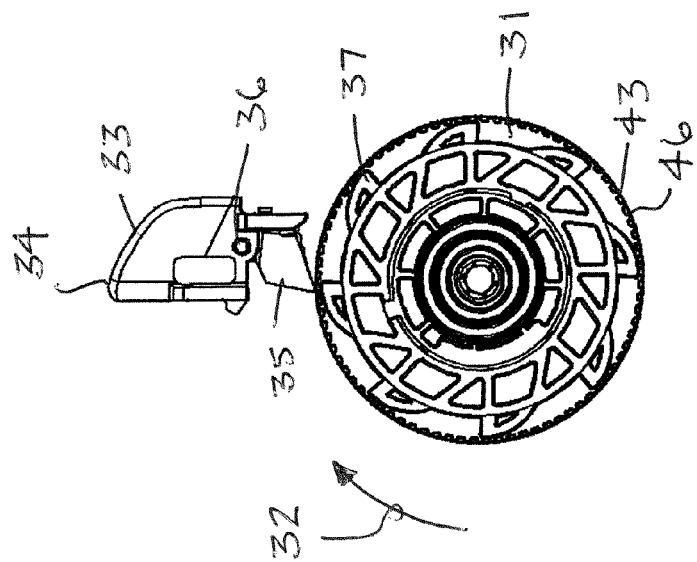
FIGS. 5a-c illustrate a second embodiment of a rope pulley and brake button in an idle position (opposite side elevational views being provided in FIGS. 5a and 5c and a front elevational view being provided in FIG. 5b)
Figure 5B:
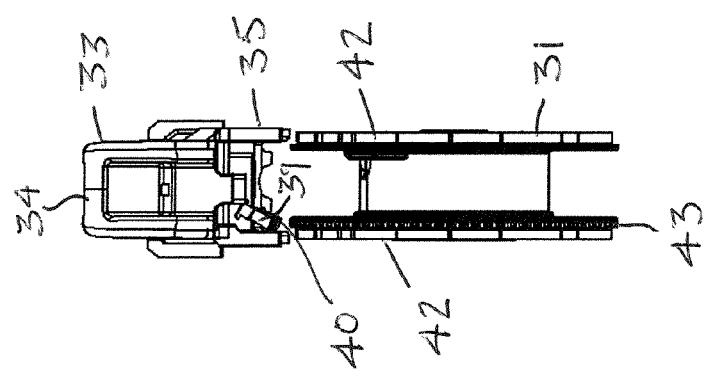
Figure 5A:
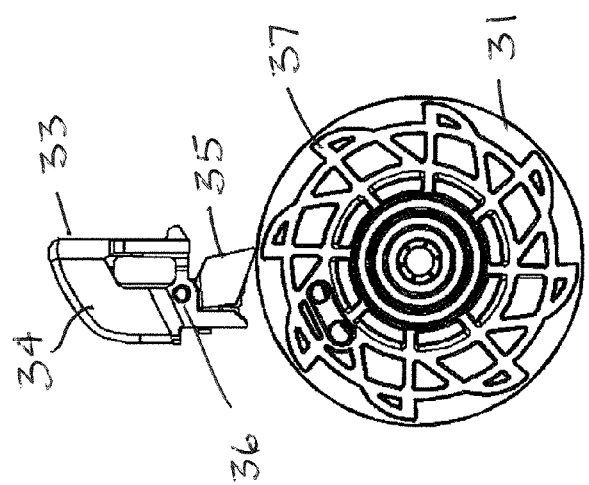
Figure 6C:
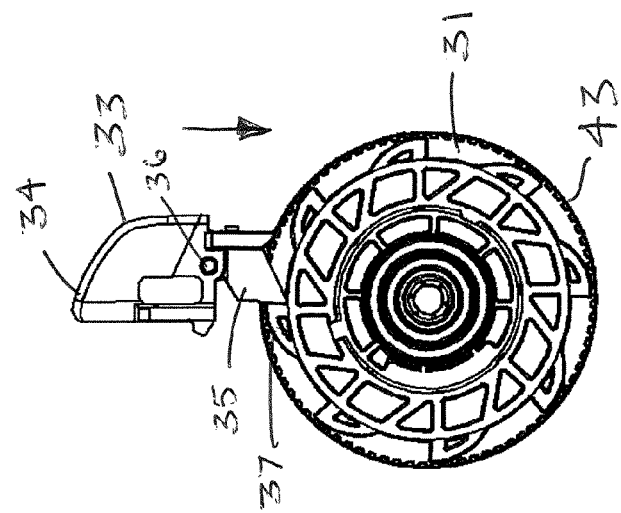
FIGS. 6a-c illustrate the rope pulley of the second embodiment with the brake button depressed and the lower part thereof in a functional position (opposite side elevational views being provided in FIGS. 6a and 6c and a front elevational view being provided in FIG. 6b)
Figure 6B:
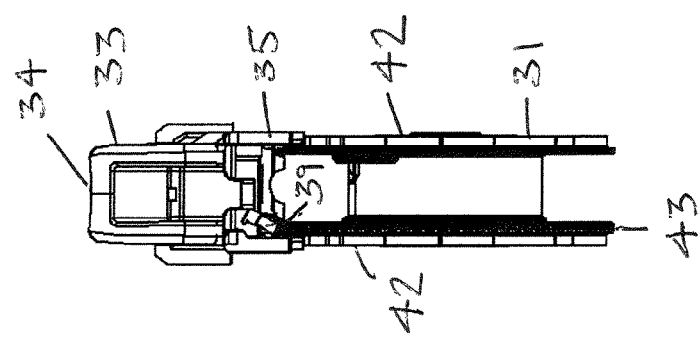
Figure 6A:
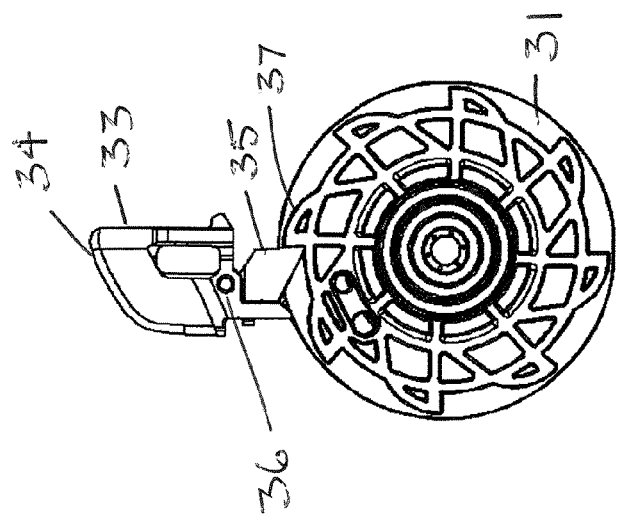

In the idle position illustrated in FIGS. 5a-5c, the lower part 35 is disengaged from the rope pulley 31. In the functional position illustrated in FIG. 6a-6c in which the brake button 33 is depressed, the pulley 31 cannot rotate in the unwinding direction 32 because the lower part 35 is in contact with the projection 37. In the functional position of the brake button 33 illustrated in FIGS. 7a-7c, the rope pulley 31 can rotate in the winding direction 44. However, the circumferential surface 43 of the rope pulley 31 penetrates into the bristles 40 of the brush 39 and thusly causes the lower part 35 to be pivoted into a position in which the lower part 35 cannot be engaged with the projections 37 of the rope pulley 31. The rope pulley 31 therefore is freely rotatable in the winding direction 44. In this position, the rope can be wound onto the rope pulley 31 due to the spring force.

Figure 8C:
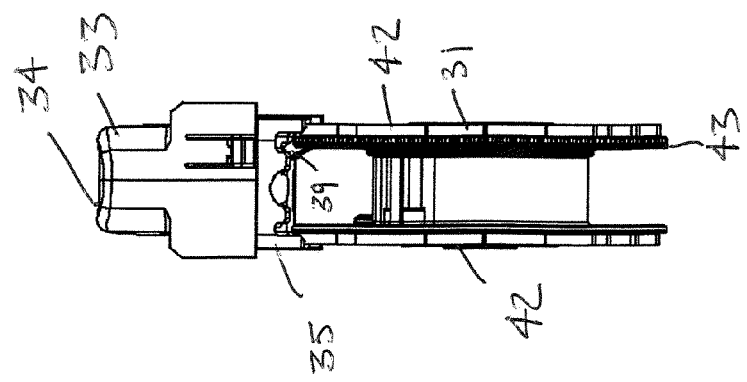
FIGS. 8a-c illustrate the rope pulley of the second embodiment with the brake button completely depressed (opposite elevational views being provided in FIGS. 8a and 8c and a side elevational view being provided in FIG. 8b).
Figure 8B:
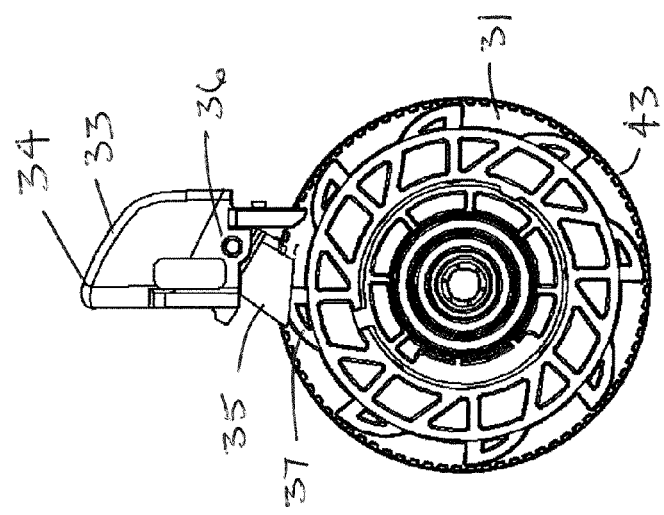
Figure 8A:
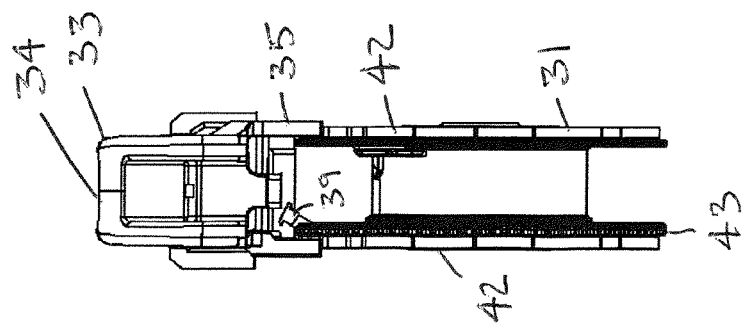

FIGS. 8a-8c show a position of the brake button 33 in which the rope pulley 31 is blocked in the winding direction 44 as well as in the unwinding direction 32.

I claim:

1. An animal leash assembly having a retractable leash, comprising:
   a rope pulley on which the leash is retractable, said rope pulley being rotatable in a leash winding direction and an opposite leash unwinding direction and having lateral flanks and a circumferential surface;
   a brake mechanism having a brake button with an upper part connected to a lower part, said lower part being able to pivot relative to said upper part and said brake button being moveable relative to said rope pulley to an idle position and a functional position; and
   brush bristles being fixed on said lower part;
   in said idle position of said brake button, said rope pulley being freely rotatable in the leash winding direction and the opposite leash unwinding direction relative to said brake button; and
   in said functional position of said brake button, said lower part engaging said rope pulley to prevent rotation of the rope pulley in the leash unwinding direction and said circumferential surface of said rope pulley engaging said brush bristles of said lower part such that said lower part is pivoted relative to said upper part when said rope pulley is rotated in the leash winding direction to thereby permit said rope pulley to rotate in said leash winding direction.

2. An animal leash assembly having a retractable leash, comprising:
   a rope pulley on which the leash is retractable, said rope pulley being rotatable in a leash winding direction and an opposite leash unwinding direction and having an axial extension with a circumferential surface on which brush bristles are fixed; and
   a brake mechanism having a brake button with an upper part connected to a lower part, said lower part having a locking tab and being able to pivot relative to said upper part, said brake button being moveable relative to said rope pulley to an idle position and a functional position;
   in said idle position of said brake button, said rope pulley being freely rotatable in the leash winding direction and the opposite leash unwinding direction relative to said brake button; and
   in said functional position of said brake button, said locking tab of said lower part engaging said rope pulley to prevent rotation of the rope pulley in the leash unwinding direction and said lower part engaging said brush bristles such that said lower part is pivoted by said brush bristles relative to said upper part when said rope pulley is rotated in the leash winding direction to thereby permit said rope pulley to rotate in said leash winding direction.

3. An animal leash assembly according to claim 2, wherein said rope pulley has an outer diameter, and wherein said axial extension is provided as a circular projection of a smaller diameter than the outer diameter of the rope pulley.

4. An animal leash assembly according to claim 3, wherein said brush bristles do not extend beyond the outer diameter of the rope pulley.

5. An animal leash assembly according to claim 2, wherein said brush bristles are made of a plastic material.

6. An animal leash assembly according to claim 2, wherein said brush bristles are arranged on the circumferential surface of the axial extension in a uniformly distributed pattern.

7. An animal leash assembly according to claim 2, wherein said brush bristles are arranged in spaced-apart bundles on the circumferential surface of the axial extension.

* * * * *